2,710,824
Patented June 14, 1955

2,710,824

FUNGICIDAL COMPOUNDS

Leon Katz, Springfield, N. J., assignor to Schenley Industries, Inc., New York, N. Y., a corporation of Delaware No Drawing. Application September 17, 1952, Serial No. 310,120

8 Claims. (Cl. 167—65)

The present invention relates to new compounds which are derivatives of the isologues, 2-hydrazinobenzoxazole and 2-hydrazinobenzothiazole, possessing remarkably high fungicidal and bactericidal activity, and which also possess in vitro antitubercular activity.

The compounds of the present invention are derivatives of 2-hydrazinobenzoxazole and 2-hydrazinobenzothiazole which conform to the following general formula:

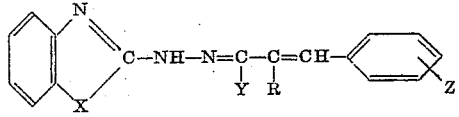

in which X is an oxygen or a sulfur radical, Y is hydrogen or a lower alkyl radical, Z is hydrogen or a hydroxyl, lower alkoxy or di-(lower alkyl)amino radical, and R is hydrogen or a lower alkyl radical. As used herein, "lower alkyl" refers to akyl radicals containing fewer than 5 carbon atoms. Typical compounds of the present invention are those obtained by the reaction of benzalacetone, anisalacetone, salicylalacetone, 4-dimethylaminobenzalacetone, cinnamaldehyde, alpha-n-amylcinnamaldehyde, and similar unsaturated ketones and aldehydes with, respectively, 2-hydrazinobenzoxazole and 2-hydrazinobenzothiazole.

In my article in the Journal of the American Chemical Society (1951, vol. 73, pages 4007 and 4010), I disclosed various derivatives of 2-benzalhydrazinobenzothiazoles. Condensation products of 2-hydrazinobenzothiazole and respectively, benzaldehyde and acetophenone, had therefore been disclosed by M. Colonna (Pubblicazioni ist. chim. univ. Bologna, 1943, No. 5, pages 3–13; Chem. Abs., 1947, vol. 41, column 754). The compounds of the present invention are distinguished from those prior compounds in their surprisingly higher fungicidal activity, particularly against the organism *Trichophyton mentagrophytes*, which is one of the many organisms present in common "athlete's foot" (epidermophytosis interdigium) infections. They differ structurally from the prior known compounds in being benzoxazole and benzothiazole 2-hydrazones of unsaturated aldehydes or ketones which have the following general formula:

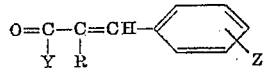

in which R, Y and Z have the significance hereinbefore specified.

The compounds of the present invention can be prepared by the condensation of 2-hydrazinobenzoxazole and 2-hydrazinobenzothiazole, respectively, with the hereinbefore specified ketones and aldehydes which are unsaturated between the alpha and beta aliphatic carbon atoms. The reaction of benzalacetone with 2-hydrazinobenzoxazole, which may be represented as:

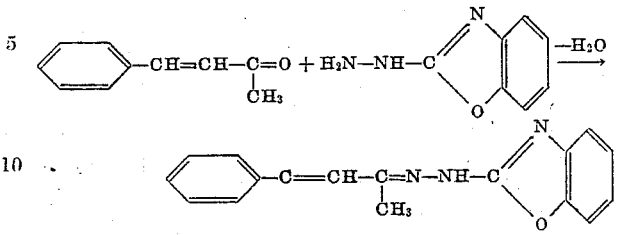

is typical of that involved in the preparation of the compounds of the invention.

For convenience in naming the compounds of the invention, they will be referred to herein as benzoxazole and benzothiazole 2-hydrazones of the specified ketones and aldehydes, although some alternative designations are also indicated. The compounds may obviously be prepared by methods other than by condensation of the aldehyde or ketone with 2-hydrazinobenzoxazole or 2-hydrazinobenzothiazole.

The following activities, which represent the concentrations of the compounds in gammas per milliliter of agar nutrient that completely inhibit growth of the organism *Trichophyton mentagrophytes* A. T. C. C. 8757, are exemplary of the compounds of this invention:

| Compound of Example No. | Name Benzoxazole 2-hydrazone of— | Melting Point, ° C. | Activity (gammas/ milliliter) |
|---|---|---|---|
| 1 | Cinnamaldehyde | 216 | 50 |
| 2 | Salicylalacetone | 160–162 | 50–125 |
| 3 | Benzalacetone | 180–184 | 50–125 |
| 4 | Anisalacetone | 144–146 | 50–125 |
| 5 | 4-Dimethylaminobenzalacetone | 190–191 | 50–125 |
| 6 | k-n-Amylcinnamaldehyde | 168–169 | 125–250 |

For comparison, a mixture of undecylenic acid and its zinc salt, which are the active constituents of several commercially available products for the treatment of fungous infections of the skin, is between 125 and 250 gammas per milliliter. Benzaldehyde benzothiazole 2-hydrazone and acetophenone benzothiazole 2-hydrazone each have an activity in excess of 250 gammas per milliliter.

In general, the activity of the compounds against *Trichophyton mentagrophytes* is greater (the concentration in gammas per milliliter is smaller) in the case of the benzoxazole 2-hydrazones than that of the isologous benzothiazole 2-hydrazones.

The foregoing activity tests were performed by preparing a solution in glycerol containing 2500 gammas (2.5 milligrams) of the compound per milliliter, and dispensing aliquot parts of this solution into preselected volumes of fluid nutrient agar in test tubes, so as to prepare agar slants having concentrations of the compound of respectively 250, 125, 50 and 25 gammas per milliliter of the nutrient agar. These slants were then inoculated with a loop (0.01 milliliter) of aviable culture of the specified organism and incubated at a temperature of 37° C. for 24 hours. In the case of the *Trichophyton mentagrophytes* A. T. C. C. 8757 organism, the incubation was at prevailing room temperature for a period of at least 4 days.

The values reported in the table are approximately the minimal concentrations in gammas per milliliter that completely inhibit the growth of the organism. A value of more than 250 gammas per milliliter is without special significance, since it may be an inactive compound.

The compounds of the present invention are also active against bacteria, yeasts, and other fungi, such as *Candida albicans*, A. T. C. C. 10231, *Bacillus cereus*, NRRL B–569, *Staphylococcus aureus*, F. D. A. 209, *Escherichia coli*, A. T. C. C. 9637, *Proteus vulgaris*, NRRL B–417, *Pseudomonas aeruginosa*, Gottlieb 29, *Brucella abortus*, Gottlieb 19, and *Mycobacterium tuberculosis*, A. T. C. C. 607. This activities of some of the compounds of the present invention in gammas per milliliter against some of these organisms is as follows:

Compound of Example 1: Benzoxazole 2-hydrazone of benzalacetone
  Bacillus cereus _____ 25
  Staphylococcus aureus _____ 25
Compound of Example 3: Benzoxazole 2-hydrazone of salicylalacetone
  Bacillus cereus _____ 50–125

All of the compounds of this invention exhibited a high activity in vitro aganst *Mycobacterium tuberculosis* A. T. C. C. 607, a concentration of 50 gammas per milliliter of each being sufficient to inhibit at least 95% growth of this organism.

2-hydrazinobenzoxazole and 2-hydrazinobenzothiazole can both be conveniently prepared from hydrazine hydrate and the corresponding 2-chloro compounds, by the method described in my article in the Journal of the American Chemical Society, 1951, vol. 73, page 4009, for the preparaton of 2-hydrazinobenzothiazole from hydrazine hydrate and 2-chlorobenzothiazole. Typical preparations of the two starting compounds by this method are as follows:

PREPARATION OF 2 - HYDRAZINOBENZOTHIAZOLE

Three hundred (300) grams of hydrazine hydrate (85%, equivalent to 5.1 moles actual $NH_2NH_2$) are charged into a 1-liter three-necked flash provided with a stirrer, dropping funnel, reflux condenser, thermometer and a Glascol heater. The solution is heated to gentle reflux and 170 grams (1.0 mole) of 2-chlorobenzothiazole is added portionwise over a period of an hour, during which period a heavy white precipitate separates. The heating is continued, while maintaining a gentle reflux, for about 45 minutes after addition of all of the specified amount of 2-chlorobenzothiazole. The mixture is then cooled, the crystals separated by filtration, washed with 1 liter of cold 50% aqueous methanol, and dried at 60° C. in a vucuum oven. The white crystalline solid 2-hydrazinobenzothiazole thus obtained has a melting point of approximately 197–199° C. and is obtained in a yield equivalent to approximately 90% of the theoretical.

PREPARATION OF 2-HYDRAZINOBENZOXAZOLE

Into a 400-milliliter three-necked flask provided with a stirrer, thermometer and dropping funnel, which is immersed in an ice bath, 60 grams of hydrazine hydrate (85%, equivalent to 1.0 mole of $NH_2NH_2$) was charged. From the dropping funnel, 27.0 grams (0.175 mole) of 2-chlorobenzoxazole dissolved in 25 milliliters of dioxane was gradually added to the flask at such a rate that the temperature did not exceed 30° C. Vigorous stirring was maintained throughout the addition and was continued for 15 minutes afterwards. The slurry was diluted with 150 milliliters of water and the crystals were separated by filtration on a Büchner funnel, washed copiously with cold water, sucked dry, and then dried overnight in a vacuum oven at 65° C. The weight of the dried crystals was 24.5 grams, which is equivalent to 93% of the theoretical yield, and they had a melting point of 150–152° C.

*Example 1.—Benzoxazole 2-hydrazone of cinnamaldehyde (2-cinnamalhydrazinobenzoxazole)*

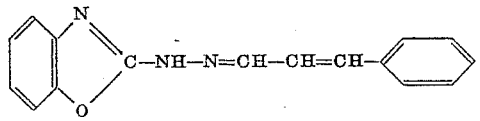

A solution of 3.8 grams (0.025 mole) of 2-hydrazinobenzoxazole in 150 milliliters of methanol and 2 milliliters of glacial acetic acid was heated to boiling and 3.3 grams (0.025 mole) of cinnamaldehyde (Beilstein, vol. 7, page 348) was then added. The heating at boiling temperature was continued for 10 more minutes and the mixture was allowed to cool. The crystals were separated by filtration and dried in a vacuum oven at 60° C. The yield of product was 88% of the theoretical and its melting point, after recrystallization from n-butanol, was 216° C. On standing in sunlight, the color of the product changed slowly from white to a faint pink.

*Example 2.—Benzoxazole 2-hydrazone of salicylalacetone 2 - (2'-hydroxy-α-methylcinnamalhydrazino)-benzoxazole)*

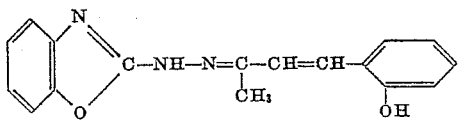

A solution of 3.8 grams (0.025 mole) of 2-hydrazinobenzoxazole in 150 milliliters of methanol and 2 milliliters of glacial acetic acid was heated to boiling and 4.1 grams (0.025 mole) of salicylalacetone (Beilstein, vol. 8, page 130) was then added thereto and the heating continued for an additional 10 minutes at boiling temperature. The mixture was allowed to cool and then chilled in an ice bath. The crystals were separated by suction filtration and dried in a vacuum oven at 60° C. The yield was 6.2 grams and the product had a melting point of 161–162° C. On recrystallization from aqueous dimethyl formamide, its melting point was 161° C. and the product melted sharper. Crystals exposed to sunlight gradually changed in color from yellow to an orange-brown.

*Example 3.—Benzoxazole 2-hydrazone of benzalacetone (2-(α-methylcinnamalhydrazino)benzoxazole)*

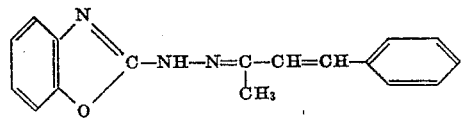

By proceeding in the manner described in Example 1, but substituting benzalacetone (Beilstein, vol. 7, page 364) for the cinnamaldehyde in equimolecular proportions, an 80% yield of the benzoxazole 2-hydrazone of benzalacetone is obtained. The product, after recrystallization from aqueous methanol, has a melting point of 180–184° C. and it slowly changes in color on standing in sunlight from white to pink.

*Example 4.—Benzoxazole 2-hydrazone of anisalacetone (2-(4'-methoxy-α - methylcinnamalhydrazino) - benzoxazole)*

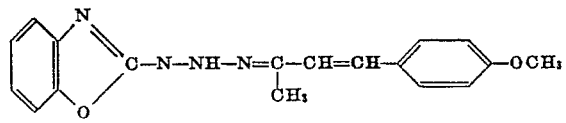

In the manner described in Example 3, but substituting an equimolecular proportion of anisalacetone (Beilstein, vol. 8, page 131) for the benzalacetone, the benzoxazole 2-hydrazone of anisalacetone is obtained as colorless crystals in a yield of 84% of the theoretical. Upon recrystallization from aqueous methanol, their melting point was 183–187° C. The crystals, on standing in sunlight, slowly changed in color from white to pink.

*Example 5.—Benzoxazole 2-hydrazone of 4-dimethylaminobenzalacetone (2-(4'-dimethylamino - α-methylcinnamalhydrazino)benzoxazole)*

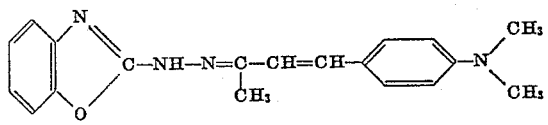

By proceeding as described in Example 2 hereinbefore, but substituting an equimolecular proportion of 4-dimethylaminobenzalacetone for the benzalacetone, the benzoxazole 2-hydrazone of 4-dimethylaminobenzalacetone is obtained in a yield of 89% of the theoretical.

4-dimethylaminobenzalacetone having a boiling point of 195–200° C. at a pressure of 10 mm., and a melting point of 136–7° C., is obtainable by the procedure of H. Rupe, A. Collin and L. Schmiderer, Helv. Chim. Acta, 1931, vol. 14, pages 1340–54 (Chem. Abs. 1932, vol. 26, page 1915), which comprises shaking and letting stand in the dark a mixture of 4-dimethylaminobenzaldehyde, acetone and aqueous barium hydroxide solution.

The benzoxazole 2-hydrazone of 4-dimethylaminobenzalacetone, when crystallized from a mixture of ethylene chloride and isopropanol, has a melting point of 189–192° C. In the sunlight the crystals gradually change in color from yellow to orange-brown.

*Example 6.—Benzoxazole 2-hydrazone of α-n-amylcinnamaldehyde (2-(β - n - amylcinnamaldehydrazino)benzoxazole)*

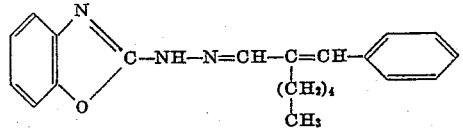

In the manner described in Example 1, but substituting an equimolecular proportion of α-n-amylcinnamaldehyde (jasmine aldehyde, $C_6H_5CH=C(CHO)—(CH_2)_4CH_3$, Beilstein, Erg. II, vol. 7, page 310) for cinnamaldehyde, the benzoxazole 2-hydrazone of α-n-cinnamaldehyde is obtained in a yield equivalent to 85% of the theoretical. The product is colored yellow but changes on standing in sunlight to an orange-brown. On recrystallization from n-butanol, its melting point is 168–169° C.

*Example 7.—Benzothiazole 2-hydrazone of benzalacetone (2-(α-methylcinnamaldehydrazino)benzothiazole)*

Into a 400-milliliter beaker on a hot plate were charged 70 milliliters of isopropyl alcohol, 5 milliliters of glacial acetic acid and 4.95 grams (0.03 mole) of 2-hydrazinobenzothiazole. The slurry was heated to boiling and a clear solution was obtained. To the boiling solution was added 4.4 grams (0.03 mole) of benzalacetone (Beilstein, vol. 7, page 364) and the mixture was heated for 5 minutes longer with stirring and then allowed to cool to room temperature. The product crystallized from the boiling solution and, after cooling, was collected on a Büchner funnel, washed with 200 milliliters of 50% aqueous methanol and dried in a vacuum oven at 60–65° C. Its melting point was 176–178° C. and it was obtained in a yield of 8.7 grams, equivalent to 98% of the theoretical. On recrystallization from aqueous ethanol, its melting point was raised to 180–182° C. The formula of the compound is the following:

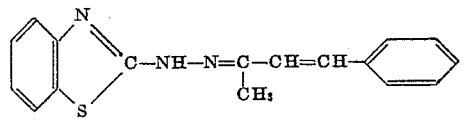

*Examples 8 to 10.—Benzothiazole 2-hydrazones of other unsaturated aldehydes and ketones*

In the same manner as described in Example 7 for the preparation of the benzothiazole 2-hydrazone of benzalacetone, the benzothiazole 2-hydrazones of cinnamaldehyde, salicylalacetone, anisalacetone, 4-dimethylaminobenzalacetone, and α-n-amylcinnamaldehyde, may be prepared, by substituting for benzalacetone the corresponding unsaturated aldehyde or ketone in equimolecular proportions. The yields of some of the products obtained and their melting points (after recrystallization) are as indicated in the following table:

| Example No. | Benzothiazole 2-hydrazone of— | Yield, percent | Melting Point, ° C. |
|---|---|---|---|
| 8 | Anisalacetone | 94 | 144–146 |
| 9 | Salicylalacetone | 99 | 177–179 |
| 10 | 4-Dimethylamino-benzalacetone | 86 | 189–192 |

The compounds of the present invention may be dispensed in various conventional forms for use as bactericides and fungicides. Thus, for use in the treatment of epidermophytosis interdigium, they may be applied to the affected parts in the form of ointments in conventional ointment bases. A suitable ointment is one composed of 90% petrolatum and 10% by weight of one or a mixture of two or more of the active compounds of this invention. The proportion of the active compound may be varied, for example, between the range of 5 to 20% by weight, dependent upon its activity. Other ointment bases, such as polyethylene glycol compounds, may be substituted for petrolatum. An example of such ointments is the following:

*Example 11.—Bactericidal and fungicidal ointment*

An ointment base is prepared from the following substances in the specified proportions by weight:

| | Parts by weight |
|---|---|
| Polyethylene glycol wax (average molecular weight between 3000 and 3700, solidifying range 50 to 55° C.) | 34.0 |
| Polyethylene glycol liquid (average molecular weight between 300 and 400) | 42.5 |
| Sorbitan monopalmitate (dispersing agent) | 0.85 |
| Water | 7.65 |

The polyethylene glycol wax and liquid together with the sorbitan monopalmitate are stirred together and heated to a temperature of approximately 70° C. The water is then added and the stirring is continued until the base congeals. To 85 parts by weight of the foregoing ointment base are then added with stirring the following solids as finely ground powders:

| | Parts by weight |
|---|---|
| Benzoxazole 2-hydrazone of cinnamaldehyde (compound of Example 1) | 10.0 |
| Ethyl p-aminobenzoate | 5.0 |
| β-Phenylethyl alcohol | 0.05 |

These ingredients are intimately incorporated by grinding, either by stirring while the base is maintained at approximately 70° C. or while cold in a roller or ointment mill.

Ointments containing one or a mixture of two or more of the fungicidal compounds of the invention may be prepared in a similar manner. The β-phenylethyl alcohol may be partially or completely replaced by geraniol or other suitable perfuming ingredient, or may be omitted. Other surface anesthetics such as 2-dimethylaminoethyl p-butylaminobenzoate hydrochloride may be used to replace the ethyl p-aminobenzoate. The sorbitan monopalmitate dispersing agent may be replaced by sodium lauryl sulfate.

The compounds may also be utilized in the form of vaginal suppositories prepared from conventional ingredients in conventional manners. A suitable composition for the preparation of such suppositories consists of 90 parts by weight of cocoa butter, 5 parts of spermaceti wax and 5 parts by weight of one or a mixture of two or more of the active compounds. The proportions, as is obvious, may be varied rather widely to obtain products having the desired activity. The preparation of a vaginal suppository is described in the example which follows:

*Example 12.—Vaginal suppository*

A suppository base is prepared by mixing together at approximately 50° C., the following ingredients:

|  | Parts by weight |
|---|---|
| Spermaceti | 5.0 |
| Cocoa butter | 95.0 |

To this base (100 parts by weight) is then added 5 parts by weight of the benzoxazole 2-hydrazone of cinnamaldehyde (compound of Example 1) and the same is ground together until a homogeneous uniform dispersion is obtained. The dispersion is then moulded, preferably by a cold extension process, into suppositories of conventional size and shape.

Instead of the base described above, an emulsifying grade of propylene glycol monostearate may be used. Perfuming ingredients such as geraniol or β-phenylethyl alcohol, with or without chlorophyllin, may also be added if desired.

Other useful preparations containing the compounds of the invention are dusting powders, which may be prepared, for example, by mixing together 70 parts of talcum powder, 25 parts of colloidal kaolin and 5 or more parts of one or more of the active compounds. Such powders may be used in place of ointments for the treatment of epidermophytosis interdigium and may also be applied to shoes and other footwear that are carriers of the infecting organisms.

Inasmuch as the foregoing specification comprises preferred embodiments of the invention, it is to be understood that the invention is not restricted thereto and that modifications and adaptations thereof may be made in conventional manner. The invention is accordingly restricted only by the scope of the appended claims.

I claim:
1. A compound of the group consisting of benzoxazole 2-hydrazones of aldehydes and ketones representer by the following formula:

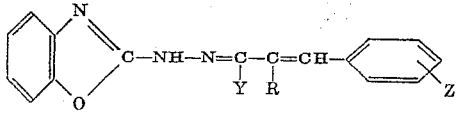

in which Y is a radical of the group consisting of hydrogen and lower alkyl, Z is a radical of the group consisting of hydrogen, hydroxyl, and di-(lower alkyl)amino and R is a radical of the group consisting of hydrogen and lower alkyl.
2. The benzoxazole 2-hydrazone of cinnamaldehyde.
3. The benzoxazole 2-hydrazone of salicylalacetone.
4. The benzoxazole 2-hydrazone of benzalacetone.
5. The benzoxazole 2-hydrazone of anisalacetone.
6. The benzoxazole 2-hydrazone of 4-dimethylaminobenzalacetone.
7. A bactericidal and fungical composition comprising a compound as defined in claim 1 and conventional dispersing ingredients.
8. A bactericidal and fungicidal ointment comprising a conventional ointment base having dispersed therein a compound as defined in claim 1.

References Cited in the file of this patent

UNITED STATES PATENTS 2,073,600   Bayer et al. _____ Mar. 16, 1937

FOREIGN PATENTS 584,381   Great Britain _____ Jan. 14, 1947

OTHER REFERENCES

Bernstein: Jr. Amer. Chem. Soc., vol. 73, pp. 906–12 (March 1951).

Katz: Jr. Amer. Chem. Soc., vol. 73, pp. 4007–10 (August 1951).

Lesser: Drug and Cosmetic Ind. 66, 6, pp. 659, 744, 745, 748–62.

I. G. F., Ger. Pat. Appl., Ser. No. 176, 219 (le 3879) (October 28, 1943).

Colonna: Chem. Abstracts, vol. 41, pp. 745–55 (1947).